US008193928B1

(12) United States Patent
Cronmiller et al.

(10) Patent No.: US 8,193,928 B1
(45) Date of Patent: Jun. 5, 2012

(54) VISIBLE AND AUDIBLE WARNING SIGNAL OPERATING AND CONTROL APPARATUS INTEGRATED INTO A SINGLE UNIT

(75) Inventors: James J. Cronmiller, West Henrietta, NY (US); Oriana J. Starr, Rochester, NY (US)

(73) Assignee: Star Headlight & Lantern Co., Inc., Avon, NY (US)

( * ) Notice: Subject to any disclaimer, the term of this patent is extended or adjusted under 35 U.S.C. 154(b) by 519 days.

(21) Appl. No.: 12/316,506

(22) Filed: Dec. 12, 2008

(51) Int. Cl.
*B60Q 1/26* (2006.01)
(52) U.S. Cl. ......... 340/474; 340/463; 340/465; 340/475
(58) Field of Classification Search .............. 340/331, 340/332, 426.23, 472, 815.45, 815.19, 901, 340/902, 988, 989, 463, 464, 465, 474, 475; 361/752; 362/493, 542, 543
See application file for complete search history.

(56) References Cited

U.S. PATENT DOCUMENTS

| | | | | |
|---|---|---|---|---|
| 5,140,304 | A * | 8/1992 | Miller | 340/472 |
| 5,422,623 | A * | 6/1995 | Bader et al. | 340/331 |
| 6,100,791 | A * | 8/2000 | Bader et al. | 340/331 |
| 6,879,263 | B2 * | 4/2005 | Pederson et al. | 340/815.45 |
| 7,046,160 | B2 * | 5/2006 | Pederson et al. | 340/815.45 |
| 7,476,013 | B2 * | 1/2009 | Gergets et al. | 362/493 |

OTHER PUBLICATIONS

Signal Vehicle Products, A Division of Star Headlight & Lantern Co., Inc., LCS800 & LCS850, Uni-Star Command Center, Siren Amplifier & Light Controller Installation and Operating Instructions, 2006.

* cited by examiner

*Primary Examiner* — Van T. Trieu
(74) *Attorney, Agent, or Firm* — Kenneth J. Lukacher; Martin Lukacher (57) ABSTRACT

Apparatus for controlling visible and audible warning signals, particularly signals from light bars, traffic director lighting, and siren and public address outputs for police and emergency vehicle applications, is provided in a single unit. Mounted in a chassis of the unit in layered relationship are a siren board and a relay board. The siren board contains amplifier and associated circuitry for generating and amplifying siren signals, and for providing microphone signals and signals from a 2-way radio of the vehicle, to a speaker which projects these audible signals for warning of and controlling emergency conditions. The relay board contains circuitry for switching power from the vehicle battery to the traffic director lighting and warning lighting (as may be provided by light bars) mounted on or in the vehicle. A microcontroller switches the lighting to the selected lighting units via relays on the board. A controller utilizing buttons providing a keypad, rotary and slide switches, is mounted on the chassis at one end thereof to provide manual access to the police or other emergency personnel for controlling the lighting and the siren, as well as public announce and radio audible signals. The entire unit is sufficiently small to be mounted to the dash or console of the vehicle and for example, may be about 6" wide, 8" deep, and 3" high.

13 Claims, 10 Drawing Sheets

FIGURE 5A
Siren Board (16)

*Relay board (10)*
FIGURE 5B

VISIBLE AND AUDIBLE WARNING SIGNAL OPERATING AND CONTROL APPARATUS INTEGRATED INTO A SINGLE UNIT

FIELD OF THE INVENTION

The present invention relates to an apparatus for the operation, command and control of audible and visual signaling devices, such as light bars, and traffic director arrow stick lighting, for police and emergency vehicles. The invention is especially suitable for providing a siren amplifier and a light controller for generation and control of audio signals, whether from a microphone, a police radio, or in the form of synthesized siren tones of various types in an integrated assembly of lighting operating means, audio signal generating means and control means thereby providing a multi function unit in a housing box, or unit, small enough to be mounted wherever convenient in a police or emergency vehicle, for example, on or below the dash or in the console of the vehicle.

The present invention eliminates the need for separate control heads and siren amplifier and lighting control devices for traffic direction lights, as well as for other warning lights as may be provided by light bars.

BACKGROUND OF THE INVENTION

Heretofore, siren amplifier and lighting controls have needed separate switch panels or control heads, traffic director controllers and siren amplifiers. The installation of such units requires the attention of a skilled electrician since multiple cables need to be hooked up to the various boxes of the system. Also the cost of manufacturing several units exceeds the cost of each unit independently, since all of the units have to be assembled separately.

Thus, it would be desirable to provide a totally integrated unit for audible and visible warning signal generation and control, and avoids the need for several units for this purpose, and also does not need a separate keyboard and switching unit for different tone selection and other audible signaling and lighting command functions. A total integrated unit would further be desirable where such integration of all of the audio and visual operations is readily changeable, for example, to provide different lighting patterns or audio tones in the single unit without need to interface to each of the units and separately programming these units for different application.

SUMMARY OF THE INVENTION

The combination and integration of all the audio and visible lighting functions in an effective manner requires the assembly thereof into a space, such as a box, which is sufficiently small to be mounted conveniently in the police or emergency vehicle, preferably on or below the dash or in the console thereof. In accordance with the invention, integration into a single unit of a siren board, which contains the siren amplifier and the tone synthesizer, and a relay board, which provides for the selection of different lighting functions for warning lights and traffic direction, together with a control panel presenting switches of various types, e.g., push button, rotary, and slide switches, for facilitating the selection of different lighting and siren tone combinations is accomplished by the invention and all in the confines of a small space, which facilitates the installation of the unit.

Accordingly, it is the principal object of the present invention to provide an integrated unit assembled in the confines of a small box, which provides siren, generation, and amplification and other audio operations as well as operating warning lights, including light bars and traffic director lights.

It is another object of the invention to provide an improved multi-function controller for warning lights, traffic director lights, public address and sirens for police and emergency vehicles, all integrated with each other within the confines of a sufficiently small space in a normally crowded cabin (the driver's area) of the police and emergency vehicle.

It is a further object of the invention to provide an improved integrated controller for commanding multiple warning functions, namely traffic director, flashing warning lights in different patterns, audible signals, sirens from a control panel which is part of the integrated controller.

The invention provides an improved method of integrating siren warning light and traffic director functions and the control thereof into a single unit, preferably a housing or box which is sufficiently small to facilitate installation thereof in the police or emergency vehicle.

More specifically, the invention carries out the integration of the apparatus for performing, controlling and operating these warning functions may be implemented with main chassis having control function circuitry on a lighting control board at the bottom of the chassis, and another board which contains the siren tone generating, siren tone and audio signal amplifying circuitry supported in layered relationship with the lighting control board. At the end of the chassis and generally perpendicular to the layered boards, is a control panel with push button rotary and slide switches for selecting the desired audible and visible signals for the various police and emergency applications.

Briefly described, the invention provides an apparatus for operation and control of audible and visible signaling devices of police and emergency vehicles by an integrated assembly of means for operating visual signaling devices, which provide warning and traffic direction illumination, together with means for operating audible signaling devices, which provide siren and announce signals. Also integrated with the audible signal operating means and the visible signal device operating device are means for controlling such visible and audible signal generating means. The invention also is provided with means which integrates both of the operating means and the controlling means in the confines of a single housing, box, or unit, and preferably a housing which is sufficiently small to facilitate the installation thereof in a space which is available in the vicinity of the driver of a police or emergency vehicle.

BRIEF DESCRIPTION OF THE DRAWINGS

The foregoing and other objects, features and advantages of the invention will become more apparent from a reading of the following description in connection with the accompanying drawings in which.

DETAILED DESCRIPTION OF THE INVENTION

The mechanical design of apparatus for providing and controlling the visible and audible warning signals for police and emergency applications will be more apparent from FIGS. 1-4. The visible signal operating means is provided by a structure embodying a board having printed circuits thereon, as well as components for switching current to the light sources of the light bars and traffic directors which are mounted on the vehicle. This structure is called the relay board 10 since it carries electrical switching devices provided by relays 12.

The means for generating audible signals, such as from a microphone 14 or the 2-way radio of the vehicle, as well as generating the siren tones is a structure mounted on another board 16 having printed circuits thereon and carrying an amplifier which amplifies the audible signals from the microphone 14 or the radio or internally generated siren tones and forwards them to one or more loud speakers which may be mounted in the vehicle, such as behind the grill at the front end thereof. This board 16 is therefore referred to as the siren board. The 2-way radio of the vehicle is connected by cable(s) (not shown in FIGS. 1-4) to the apparatus such as via connector 86.

Figure 2:
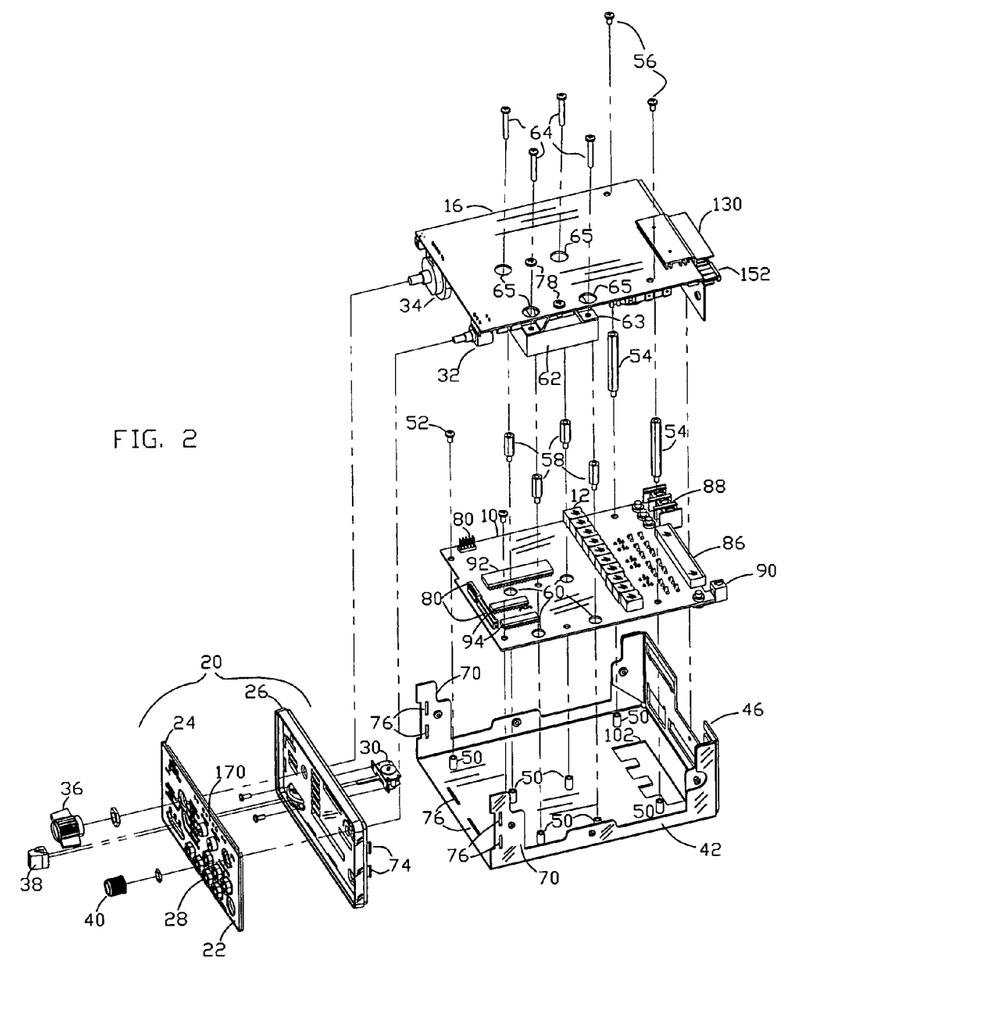
FIG. 2 is an exploded view of the unit shown in FIG. 1 without the cover.
Figure 3:
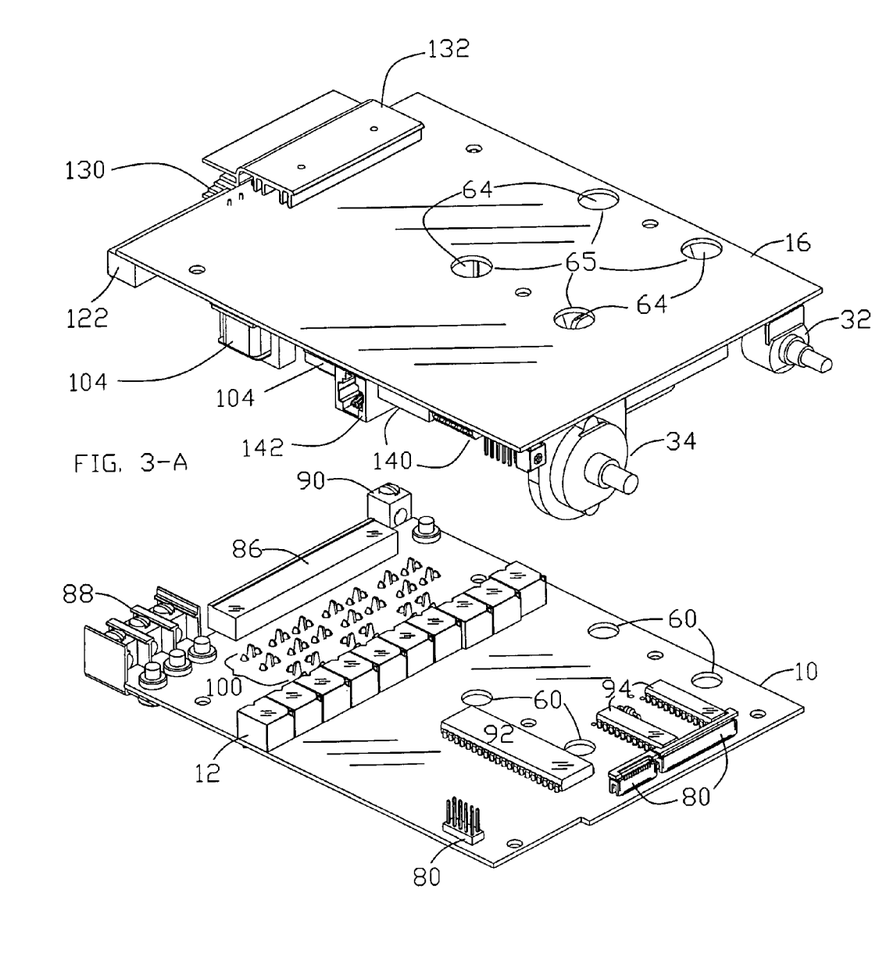
FIG. 3A is an exploded, perspective view showing the siren board and the relay board in their spaced, layered relationship when viewed from the top so that the surface of the relay board is exposed, where the cabling between the boards is eliminated to facilitate the illustration.
FIG. 3B is a perspective view, similar to FIG. 3A, but taken from the bottom and exposing the circuitry on the siren board, which is opposed to the circuitry on the relay board, and also showing the bottom of the relay board with fuses extending therefrom.

Another principal part of the apparatus for generation and control of visible and audible warning signals is the control means thereof which is provided by a control panel 20. This panel includes a board or faceplate 22 having a board 24 with printed circuits attached as by adhesive to the rear side thereof as shown in FIG. 2. This faceplate and board snaps into a frame in the form of a bezel 26. The faceplate has an array of push buttons 28 and carries a slide switch 30, this slide switch provides multifunction selection capability of different combinations of light signals and audible warning signals. The front panel also presents a rotary switch 34 and an on/off switch/volume control 32, knobs 36, 38, and 40 attach and operate the rotary switch 34, the slide switch 30, and the on/off switch/volume control 32, respectively (See also FIG. 2). The faceplate panel including the faceplate 22, the printed circuit board 24, and its framing bezel 26 with the push button switches 28 and the other switches 30 and 34 projecting therethrough provides a user interface, giving access to the operator, such as the driver in the front seat or front cabin of the police or emergency vehicle to have access to all of the audible and visible signal control functions of the apparatus. Accordingly, this panel assembly may be referred to as the user interface board 20. Buttons, switches, and knobs, shown are examples, as other elements enabling user to interface with the apparatus may also be used.

The user interface board 20, the relay board 10, and the siren board 16 are assembled in a housing or box defined by a chassis 42 and a cover 44. The user interface board 20 is mounted at an access or front end of the box while the rear end of the box is defined by a U-shaped panel 46 which is secured to the chassis 42. Accordingly, the apparatus is a single integrated unit which carries out all of the visible and audible operating and control functions. This unit may be sufficiently small to be mounted with the aid of a suitable bracket below or above the dash of the vehicle or in the console between the seats of the vehicle. Because of the integration of the boards 10, 16, and 20, the unit may for example be only about 6" wide, 8" deep or long and 3" high. The size of the unit provides installation flexibility, which is a feature of the invention.

Integration in a single unit is facilitated by the relay and siren board structures 10 and 16 being in layered relationship. This layered arrangement is provided by mounting the relay boards on posts 50 staked to the chassis 42 at the bottom thereof. Some of these posts receive screws 52, which attach the front end of the relay board to the bottom of the chassis. The posts 50 at the rear end of the chassis receive spacers 54 having male and female threaded ends. The male ends go through holes in the board 10 and fasten, like bolts, the board 10 to the posts 50. The female threaded ends of these posts 54 act like nuts and accept screws 56 which fasten the siren board in spaced relationship above the relay board.

The spaced or layered relationship of the boards and their secure assembly is also provided by spacer posts 58 which extend through holes 60 in the relay board and are fastened like bolts in four of the studs 50 which are staked into the chassis 42. The upper or nut end of these spacer posts 58 are attached to an output transformer 62 which is part of the amplifier on the siren board 16. This transformer has four through holes near the opposite corners thereof. Bolts 64 extend through these holes and attached the siren board 16 in spaced relationship with the relay board 10 to the base of the chassis 42 via the spacers 58 and four of the studs 50.

The interface board 20 is attached to the chassis at the front or forward facing end thereof so as to be perpendicular to the layered relay board 10 and siren board 16. The front of the chassis has columns 70 with tongues which locate the interface board. Other tongues 74, extending from the interface board 20, snap into grooves 76 in these posts 70.

Figure 1:
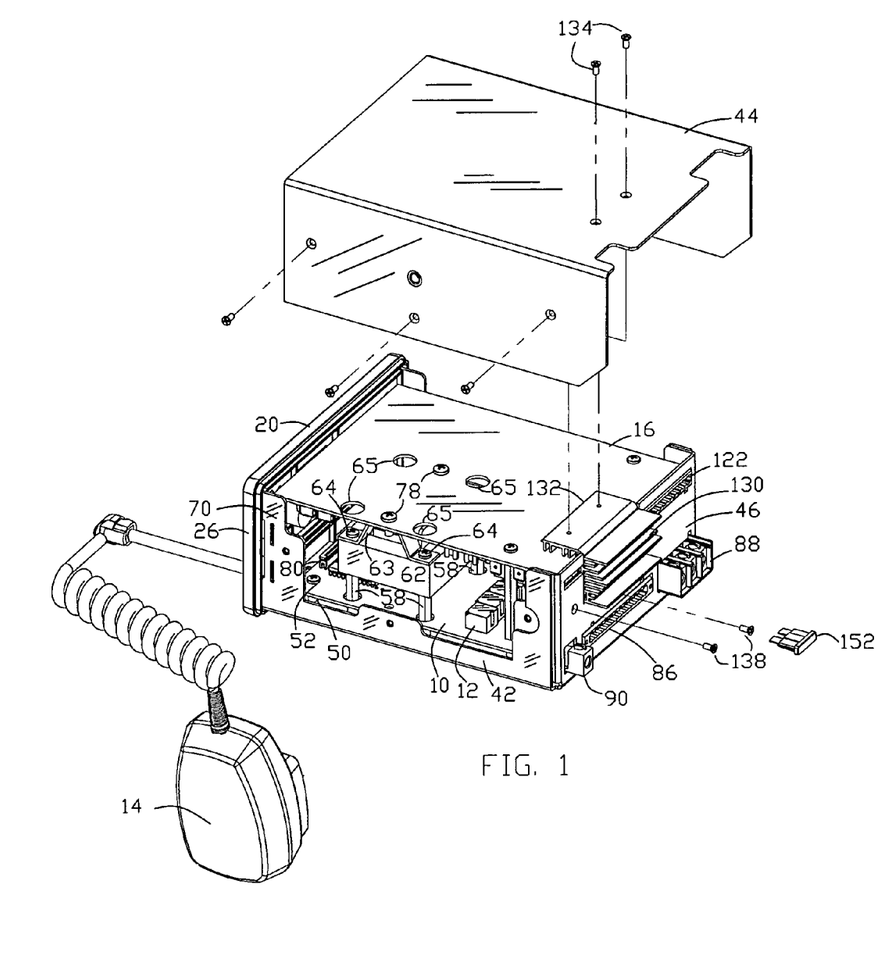
FIG. 1 is a perspective, exploded view from the side of the apparatus for visible and audible warning signal operation and control, which is integrated into a single unit, where the view is looking toward the back of the unit from one side thereof, with the cover removed.

It will be noted from FIG. 1 that the transformer 62 has brackets 63 along opposite edges thereof into which the siren board is screwed by screws 78. It will be also noted that there are tongues 74 extending from the lower edge of the bezel 26 (see FIG. 2), which fit into slots similar to slots 76 which are located along the front edge of the base of the chassis. It will also be noted that there are access holes in the siren boards 16 for the hold down bolts 64 which extend through the holes in the transformer 62 and fasten to the spacers 58.

In addition to the relays 12, the relay board carries connectors 80 which carry ribbon cables, not shown, to other connectors to the interface board 20 and on the siren board 10. An output connector 86 along the rear edge of the relay board connects to the various light sources and carries current thereto. The rear end of the relay board also carries power terminals 88 and 90 for power cables to the vehicle battery and ground, respectively. A microcontroller in the form of a microprocessor chip 92 is mounted on the relay board and provides for operation of the relays 12. Other chips 94 are multiplexer chips which control indicator LEDs in the interface board for indicating the operation of the push button switches 28, the slide switch 30, and how the traffic director lighting is being illuminated and to indicate other functions such as to show when the siren loudspeakers are operating, and may be part of a self-testing operation to indicate the compliment of speakers which are used or if the speakers may be short-circuited.

Figure 5:
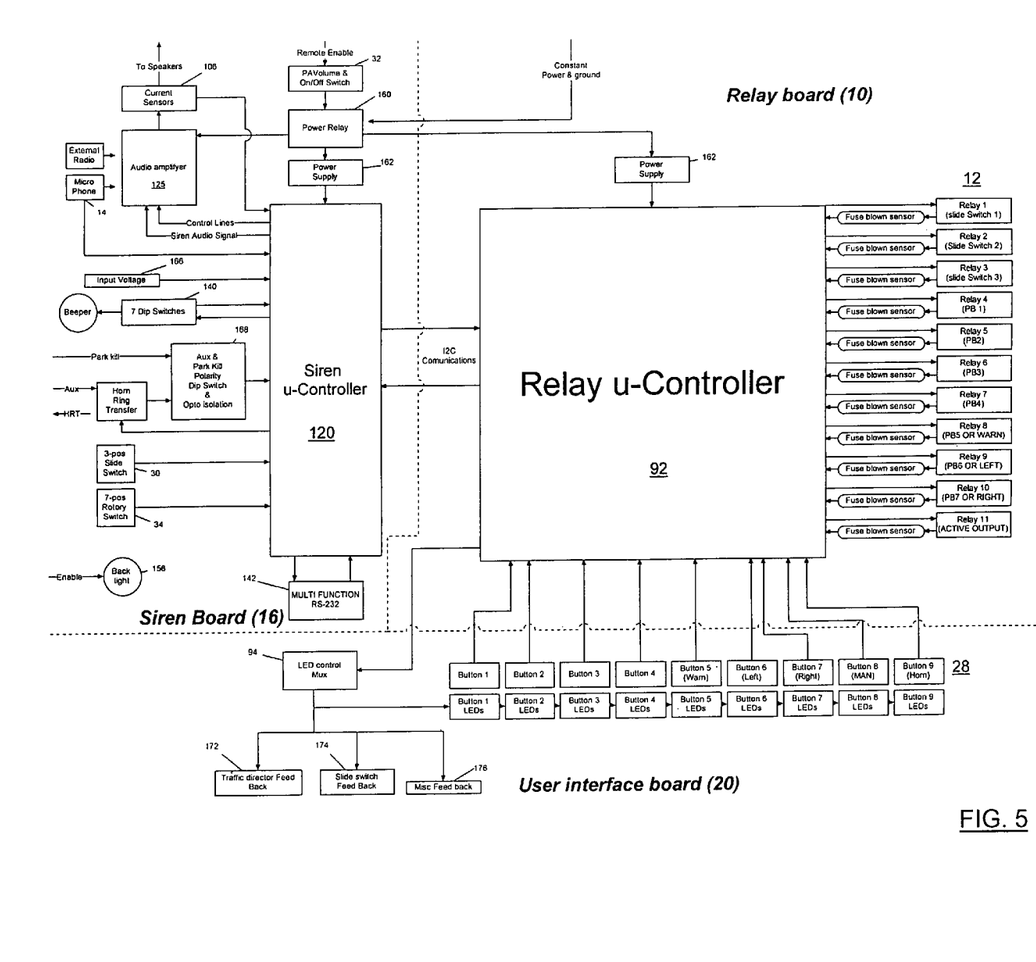
FIGS. 5A, 5B, and 5C are a connected block diagram schematically showing the circuitry on the relay board and the siren board, and on a board in the control panel which provides a user interface board, the user being the police or emergency personnel manning the vehicle and utilizing the unit.
Figure 5A:
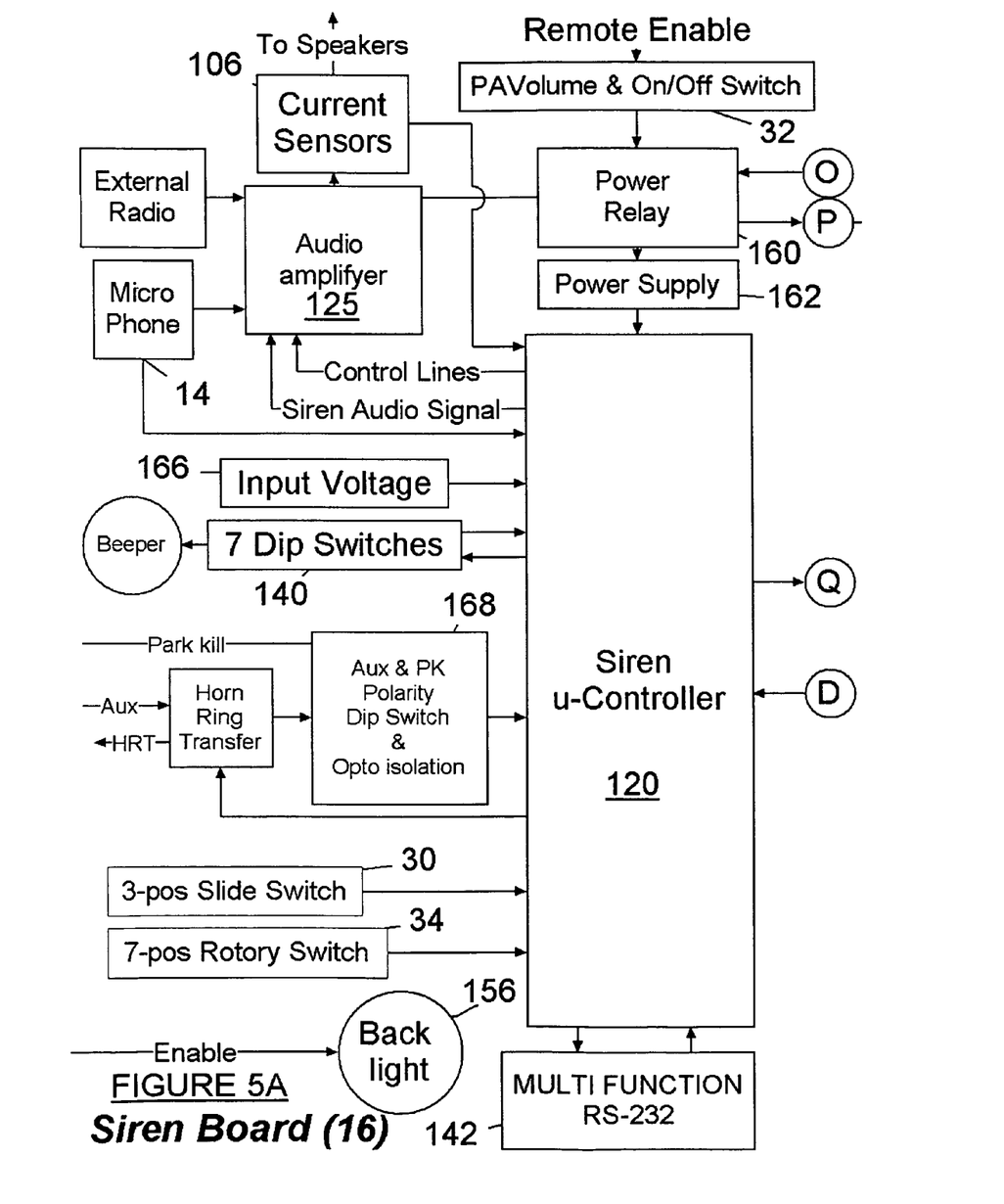
Figure 5B:
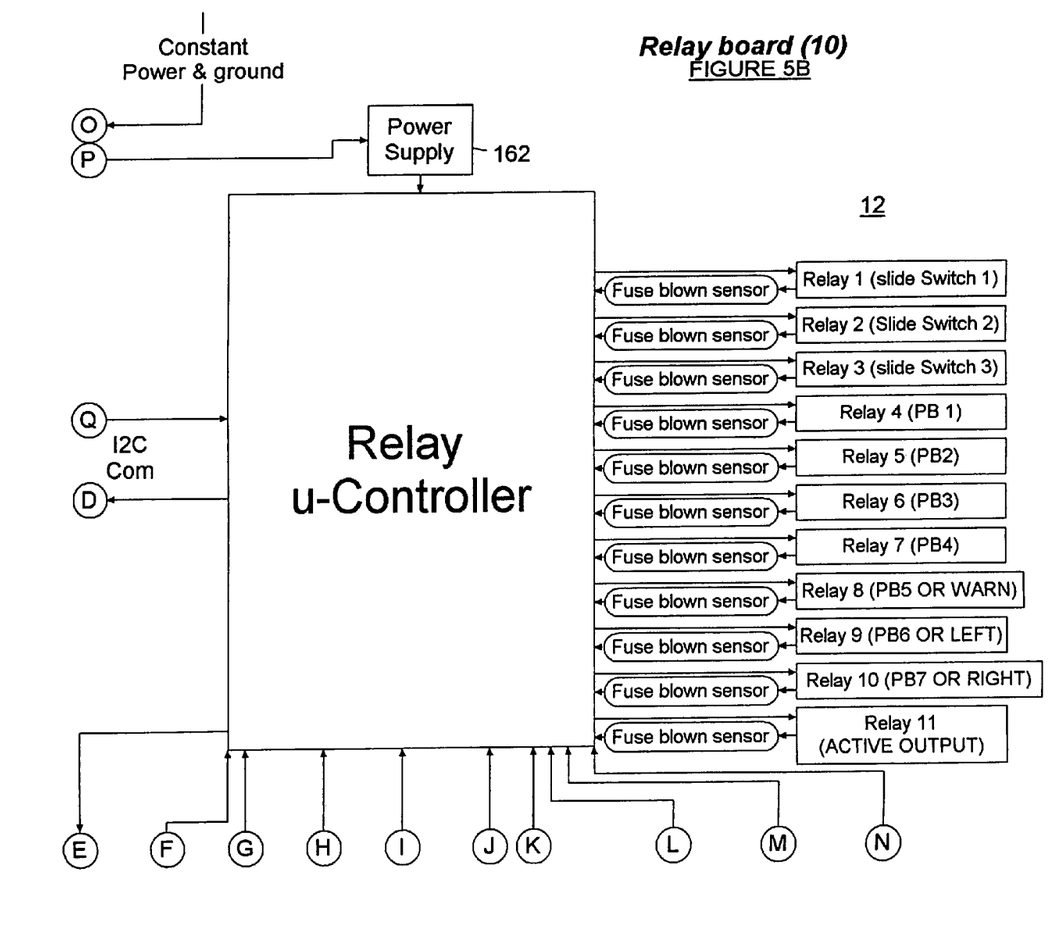
Figure 5C:
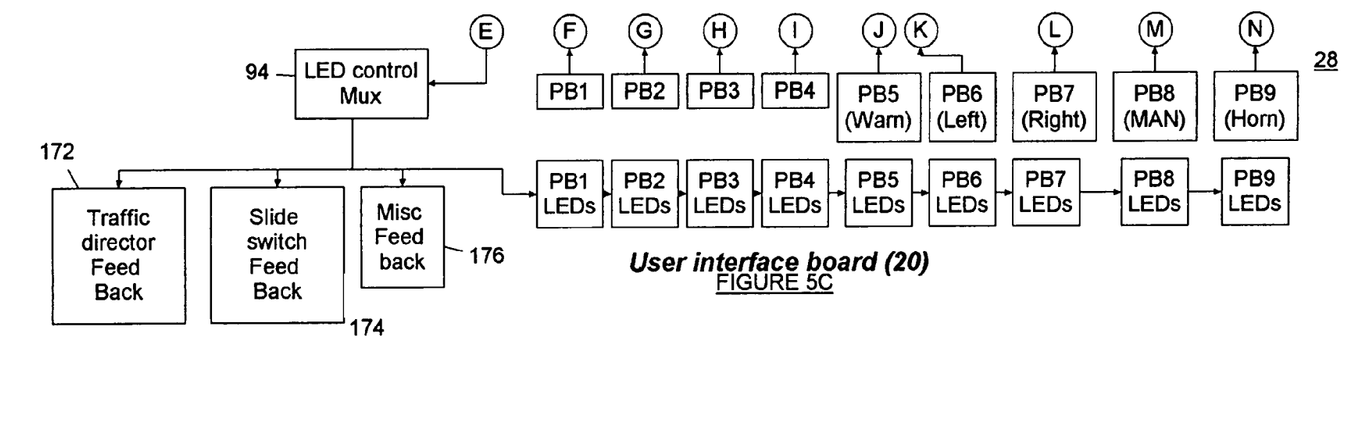

The system of circuits on the relay board will be discussed later in connection with FIGS. 5A-C in which lines bridging FIGS. 5A-C are connected by circled letters, wherein the circuits are shown in their compartmentalized relationship on the relay board 10, the siren board 16, and the interface board 20.

The relay board 10 also mounts an array of fuses 100 for the lighting outputs, these fuses are connected between the relays 12 and the lighting output connector 86. They may be automotive type blade relays. They are accessible through openings 102 (see FIG. 2) in the base of the chassis 42.

The siren board 16 includes the siren/public address amplifier 125 (FIG. 5A). This amplifier contains the output transformer 62, preamplifier or input transformers 104 (see FIG. 3B), output current sensing transformers 106 and power transistors 108 as well as associated circuitry including filter capacitors 110. The power amplifier circuit may be of the push-pull type.

Input to the amplifier 125 on the siren board 16 is a siren microcontroller 120 which is mounted directly on the board 16, much like the microcontroller 92 on the relay board. The microcontroller 120 is behind a switch 34 in FIG. 3B. Both of the microcontrollers 92 and 120 may be suitable microprocessor chips, for example, the 40 pin chips sold by PIC Company, part number 18F 4321. The chip of the microcontroller 120 generates various siren tones, as selected by the switches 30 and 34. The selected tones are amplified in the amplifier 125 on the siren board 16 and outputted from the output transformer 62 to the speakers via an output connector 122. The power amplifier is shown at 125 in the schematic diagram in FIG. 5. It will be noted also that the controller 120 receives inputs from the microphone 14 to indicate that it is enabled and operates to turn off the tone generation when a microphone enable switch thereon (not shown) is pressed to connect to the microphone, thereby overriding the tone warning signals with audible public address signals, when the microphone is operated. The microphone output is amplified in the amplifier 125 as shown in FIG. 5. The control of the warning signal functions by the slide switch 30 on the faceplate is communicated between the user interface board and the microcontrollers 92 and 90 by way of the ribbon cables (not shown) connecting the connectors 80 on the relay board with connectors 80 on the interface board 20 as shown also in FIG. 4.

It is a feature of the invention to utilize not only heat dissipating members 130 and 132 on the siren board 16, but also utilizing the entire box including the chassis 42 and the cover 44 as heat dissipating members. To this end, the upper heat dissipating or heat sink member 132, which may be integral with the finned heat sink member 130, is attached to the cover 44 by screws 134 as shown in FIG. 1. Also, a heat dissipating plate 136, which is sandwiched between the amplifier power transistors 108 and the heat sink member 130, may be connected to the back panel 46, which is directly connected to the chassis, for direct heat transfer. This connection may be provided by screws 138 as shown in FIG. 1 and also in FIG. 3B.

Figure 4:
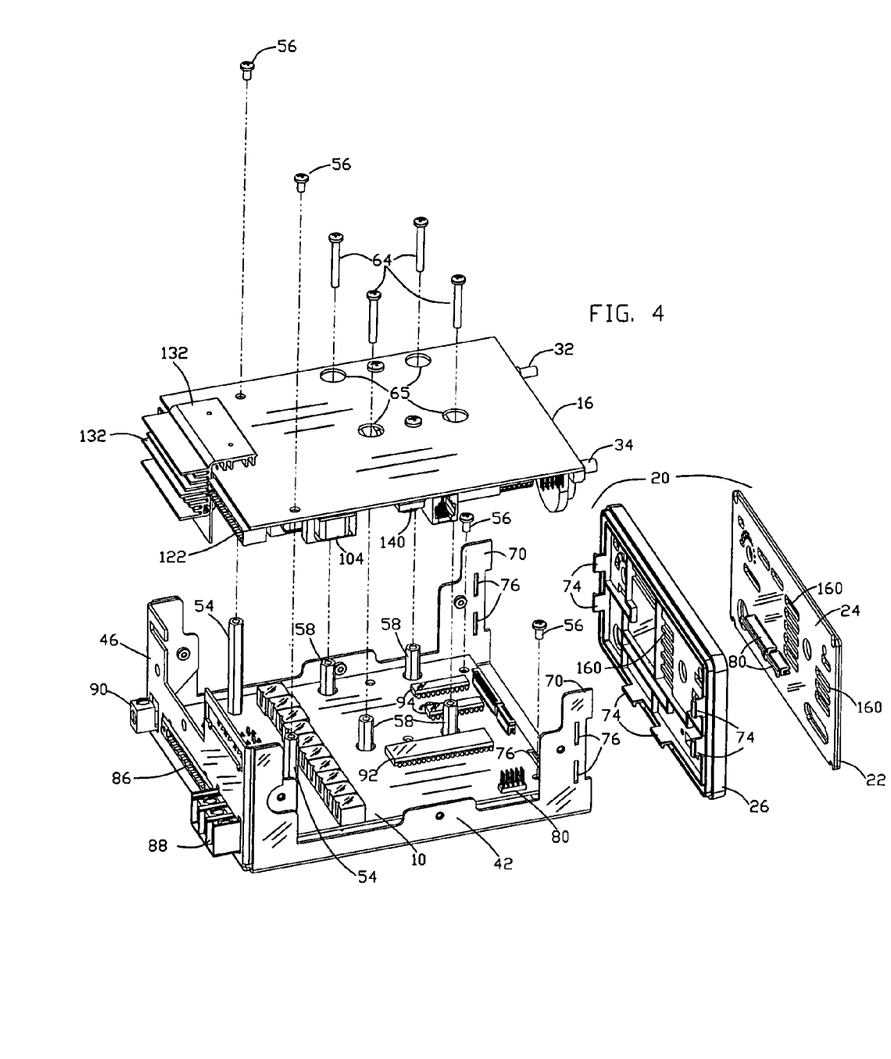
FIG. 4 is an exploded view, similar to FIG. 2, but looking toward the rear of the unit; the face of the control panel being visible in FIG. 2, while the rear of the control panel is visible in FIG. 4.

As shown in FIGS. 3A and 3B as well as in FIG. 4, the siren board 16 carries arrays of DIP switches 140, which enable the selection of siren tones, as well as accommodation of battery polarity changes (different car manufacturers using different battery polarity outputs). Also on the siren board is a RS 232 connector socket 142 which allows the unit to be connected to an external computer for programming or operation in lieu of operation by the push buttons and switches access via the interface board 20. The connector in socket 142 provides communication with external hardware for when expanded light controls are needed.

The interface board has various holes therethrough for background illumination backlighting LEDs 156 mounted on the siren board 16. These backlighting LEDs may be amber in color to distinguish them from the indicator LEDs associated with the push buttons and slide switches, which may be red or green to indicate whether on or off operating conditions, are selected.

Referring more particularly to FIG. 5, the power from the battery is switched under the control of the switch 32 or via a remote enable to a power relay 160, which turns the system on and off. The microcontroller chips 92 and 120 receive their power through power supplies 162, which may be DC-DC converters providing the voltage for operation of the microchips 92 and 120. Operating power is also provided from the battery via the relay 12 to the audio amplifier 125. The output from the amplifier to the speakers is sensed in current sensors. Excess current (for example, shorts) thereby shuts down the amplifier 125 via control lines from the siren controller 120.

The siren controller synthesizes the various selected tones and applies them to the speakers after amplification by the audio amplifier 125. The audio amplifier 125 also can repeat police 2-way radio transmissions which are picked up by the radio in the vehicle, an appropriate control being provided to override the siren operation when radio repeat is desired. As noted above, the operation of the microphone 14 controls the microcontroller 120 to override any selected siren tone generation. An input voltage sensor 166 senses input voltage and in case of an over voltage from the battery (15 volts or higher) overrides any siren tone generation.

The microcontroller may be programmed via the DIP switches 140. These DIP switches can be used to enable a beeper which receives signals from the LED control multiplexer chips 94 so that a beep tone is sounded upon the activation of any function with the push buttons.

Circuitry associated with the DIP switches indicated at 168 provides a "park kill" function so that when the vehicle door is open, the siren tone generation is shut off so as to prevent the user from being deafened by the loud siren when he or she is out of the vehicle. The DIP switches may also be set to conform the voltage to the controller and other parts of the system to the proper polarity, which may be reversed in the case of Ford vehicles from that of Dodge vehicles.

The circuitry 168 also receives an input from the horn ring on the steering wheel of the vehicle and switches control from the slide switches and the rotary position switch 30 and 34 to the horn ring so that siren tones may be generated by actuating of the tone ring rather than with the rotary position switch and slide switch. The backlight may be switched off from a switch on the siren board via an enable inhibit switch, as shown by the connection to the backlight LEDs 156 in FIG. 5.

The buttons in the array 28 are utilized in the relay controller 92 to select the operation of different lights sources in the light bar associated with the vehicle and in the case of push buttons 5, 6, and 7 to select different traffic direction functions in accordance with the programming of the relay microcontroller 92. Siren control functions may also be operated with buttons 8 and 9; signals being relayed via the relay controller to the siren controller for this purpose. For example, the manual (man) button 8 selects a whooping tone while it is held in by the user. If the user holds in button 9, a tone is generated which simulates an air horn burst of sound. It will be appreciated that the relay microcontroller circuit 92 operates a wave form generator in the siren microcontroller 120 on the siren board to generate the requisite tones. The other buttons in the array 28 are multiuse lighting control buttons. The buttons 5, 6 and 7 for traffic director functions may be programmed in the microcontroller 92 to provide additional lighting control functions when the vehicle is not equipped with a traffic director (arrow head) lighting unit.

Figure 6:
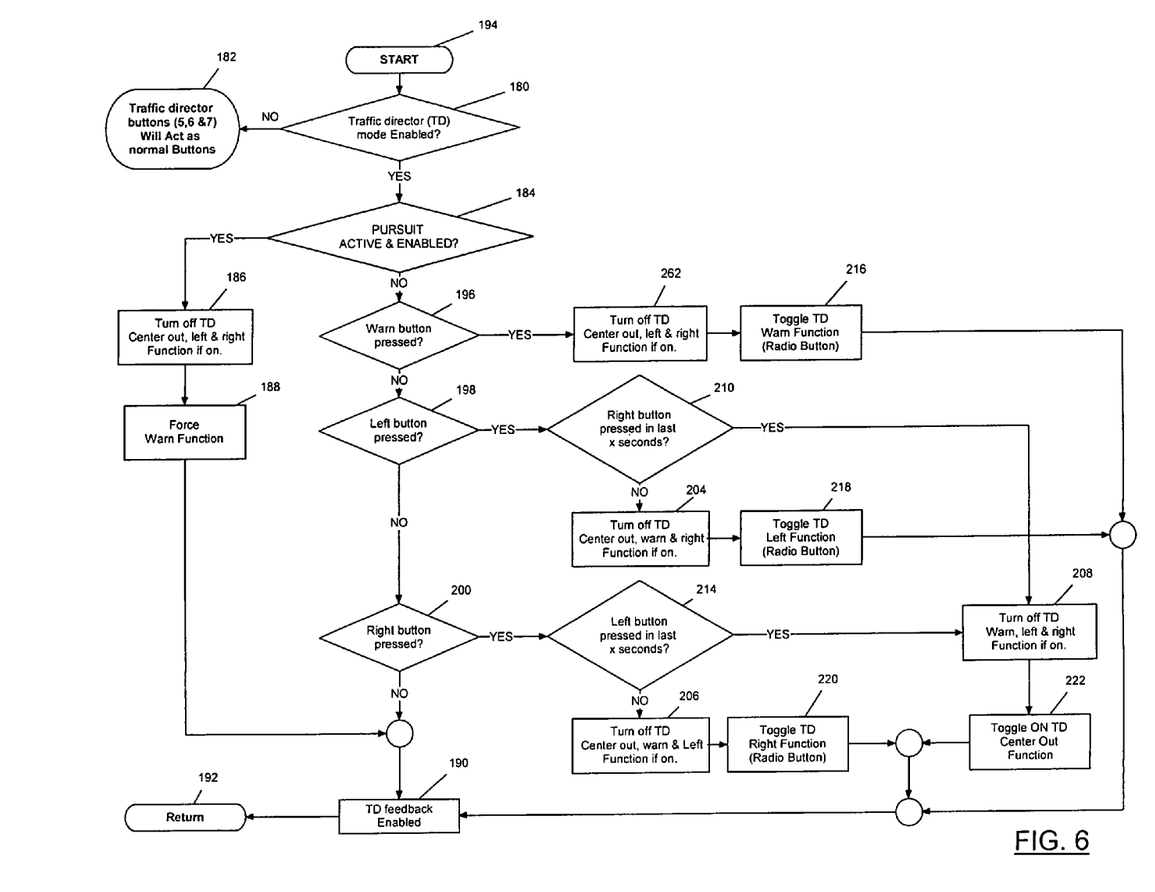
FIG. 6 is a flow chart showing the programming of the microprocessor, also called a microcontroller, on the relay board for carrying out the traffic direction functions.

The operation of the buttons is indicated by LEDs which are built into the board 24 behind the buttons. The relay microcontroller 92 operates the LED control multiplexer chips 94 so as to illuminate the actuated button or buttons. There may be an LED (red) when the button is actuated and another LED (green) when it is not pushed in. The operation of the traffic director programs in the relay microprocessor 92 provides whatever lighting of the traffic director is selected. The selection may be from the center out in either left or right direction so as to direct traffic to the right or left of the vehicle, or simultaneously center out to direct traffic around the vehicle or a condition warn which is a flashing condition to provide visible warning signals in addition to those which may be provided by the light bar associated with the vehicle. The programming for traffic director operation is shown in FIG. 6. The illumination of the traffic director LEDs, shown near the top of the faceplate at 170 is controlled via the multiplexer chips 94 as indicated at 172.

The slide switch 30 has an off position to the left as viewed looking into the control panel and allows rapid selection of progressive mounted illumination, for example to illuminate light sources at the end of the bar in the first position and additional light sources in the second and third position. Also in the third position, which may be the so-called pursuit mode, the siren as well as the warn illumination from any traffic director which is installed in the vehicle may be operated. Additional LEDs may be disposed on the user interface as indicated by the miscellaneous (misc) feedback block 176 to identify whether the speaker is responding to the outputs of the amplifier, the number of speakers which are hooked up to the power amplifier and if the speakers are operative or inoperative, say short circuited, thereby providing for self-test for the system. Similarly, the slide switch feedback illumination LEDs 174 indicate where the slide switch is positioned.

Each relay in the array is associated with a fuse blown sensor so as to provide indication of proper or improper operation by indicator LED's associated with the miscellaneous feedback function 176. The relays operate the selected lighting function and in the case of relay 11, applied power to a video recorder whenever the lighting, siren or PA functions have been selected by the push buttons or the slide switch, thereby automatically recording the emergency condition in effect when the siren or emergency lighting functions are in operation.

Referring to FIG. 6, the traffic direction programming of the relay microcontroller 92 starts when the traffic direction mode is enabled, which occurs when a traffic director light bar is installed on the vehicle. If the light bar is not installed, traffic director buttons 5, 6, and 7 may be programmed to act as normal lighting control buttons as indicated at 182.

In the traffic director mode, the slide switch condition is tested for the pursuit mode (the slide switch be all the way over to the right or position 3 as view from the front of the unit) and whether pursuit is active and enabled, as shown at 184, the unit will disable the traffic direction functions center out or left and right, as indicated at 186. Then action is taken at 188 to force the warn function on so that additional lighting is obtained during the pursuit mode from the traffic director lighting devices. The program also enables the traffic director display 170 (FIG. 2) to flash the traffic display LEDs indicating that the warn condition is enabled.

The program will proceed to light the appropriate LEDs in the display 170 when other traffic directing conditions are selected by the push buttons 5, 6, and 7. The traffic director display operation is indicated by the TD (traffic direction) feedback enabled action block at 190. After all of the operations are programmed, the program returns as indicated at 192 and remains in the selected traffic direction condition until returning to start as indicated at 194.

The program elects four different conditions depending upon whether the warn button 5 is depressed, the left button 6 is depressed, the right button 7 is depressed, or both the right and left buttons are depressed for a certain period of time, say x where x may be 10 seconds.

The program is designed to ensure that the operation of the buttons is interlocked so that only one function may be operated at a time except when the center out illumination is selected by pressing the left and right buttons sequentially within x seconds. This is accomplished by detecting the pressing of the button as indicated at 196, 198, and 200 and then turning off the lighting conditions which are not selected. Thus, if warn is selected at 196, the other functions than warn are turned off at 202. Similar conditions are carried out at 204, 206, and 208 for the right, left and center out conditions respectively. Center out is detected by either the left and right buttons being both pressed within x seconds as indicated at 210 and 214. The program assures that the selected function is changed after each pressing of a button which controls that function. For example if the warn button is pressed, the condition is toggled with each depression of the button. Thus, if warn is on, it is turned off when the warn button is pressed and turned on when it is pressed a second time. This enables the user to select a function without looking at the display to see what function is active. The toggling functions also facilitate interlocking of the operation of the buttons and are indicated at 216, 218, 220, and 222. Accordingly, only the desired traffic control function is selected by operation of the programming of the relay microcontroller 92.

From the foregoing description it will be apparent that there has been provided an improved, integrated audio and visual warning signal operating and control unit and includes a system for interlocked operation of traffic direction conditions for traffic direction lighting. Variations and modifications in the herein described apparatus and its methods of implementation and operation will undoubtedly suggest themselves to those skilled in the art. Accordingly, the foregoing description should be taken as illustrative, and not in a limiting sense.

What is claimed is:

1. An apparatus for operation by a user of audible, visual, and visual traffic directing warning devices of police and emergency vehicle, said apparatus comprising:
    first means for enabling visual signaling devices;
    second means for controlling and driving audible signaling devices which provide siren and public address signals;
    third means for controlling and driving traffic directors selected from at least one of center out in left or right direction so as to direct traffic with respect to the vehicle, using logic for controlling operation of each of said traffic directors;
    fourth means for enabling a user, through the use of buttons and switches, to operate said first means, said second means, said third means so as to select one of different patterns of operation of one or more of said visual signaling devices, audible signalizing device, and traffic directors, and to provide a user with visual feedback displaying as to which of said one of said different patterns selected; and fifth means for combining all of the said first means, said second means, said third means, and said fourth means in a single unit compact enough to fit under a dashboard or a center console of said vehicle.

2. The apparatus according to claim 1 wherein said unit occupies is a structure which does not exceed about 144 cubic inches in volume.

3. The apparatus according to claim 2 wherein said structure is a box shaped structure.

4. The apparatus according to claim 3 wherein the exterior dimensions of said structure are about 6 inches wide, 8 inches long, and 3 inches in height.

5. The apparatus according to claim 1 wherein said first means, said second means, and said third means are separate structures assembled in layered relationship in a chassis and said fourth means comprises a face plate assembled to said chassis for presenting to the user said buttons and said switches accessible for manual actuation by the user, in order to visually display states of actuation of said visual signaling devices, said audible signaling devices, and said traffic directors.

6. The apparatus according to claim 5 wherein said structures are in said layered relationship by being vertically spaced from each other and said face plate is exposed from said chassis of an end thereof in substantially perpendicular relationship to said structures.

7. The apparatus according to claim 6 wherein a cover is assembled to said chassis over said structures.

8. The apparatus according to claim 1 wherein said second means comprises a siren board on which an amplifier and a siren signal controller are mounted, said first means comprises a relay board for connecting power to selected lighting ones of visual warning devices and a controller for selectively applying current to different ones of said visual warning devices.

9. The apparatus according to claim 8 wherein said relay board and siren board are disposed in layered relationship in a chassis and including a user interface having switches accessible to a user which is mounted in said chassis at one end of said layered siren and relay boards.

10. The apparatus in accordance with claim 9 wherein heat dissipating members including a heat dissipation plate are attached to said siren board for dissipating heat from a power amplifier which carries said audible signals, said chassis and a cover for said chassis enclosing said layered siren and relay board being connected in heat conductive relationship to said heat dissipating members and said heat dissipation plate.

11. The apparatus according to claim 8 further comprising a microphone connected to said siren board which amplifies in said amplifier audio signals from said microphone for driving a speaker.

12. The apparatus according to claim 8 wherein the vehicle has a radio and said siren board amplifies audio signals from said radio for driving said amplifier and speaker.

13. The apparatus according to claim 1 wherein said fourth means comprises computer controller for operating said first, second, and third means responsive to selection of said button and switches to select one of different patterns of operation of one or more of said visual signaling devices and traffic directors which provide at least patterns pointing to the right, a lighting pattern pointing to the left, a lighting pattern pointing both to the right and left at the same time, and a flashing of said visual signaling devices and traffic directors.

* * * * *